(12) United States Patent
Dygert et al.

(10) Patent No.: US 10,889,048 B2
(45) Date of Patent: Jan. 12, 2021

(54) TAMPER EVIDENT CLOSURE FOR CONTAINER

(75) Inventors: Douglas Dygert, Olive Branch, MS (US); Dan Gamber, Lakeland, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 491 days.

(21) Appl. No.: 12/816,906

(22) Filed: Jun. 16, 2010

(65) Prior Publication Data

US 2011/0089133 A1 Apr. 21, 2011

Related U.S. Application Data (60) Provisional application No. 61/347,262, filed on May 21, 2010, provisional application No. 61/251,931, filed on Oct. 15, 2009.

(51) Int. Cl.
*B29C 49/48* (2006.01)
*B65D 41/34* (2006.01)
*B65D 1/02* (2006.01)

(52) U.S. Cl.
CPC .............. *B29C 49/48* (2013.01); *B65D 1/023* (2013.01); *B65D 41/3409* (2013.01)

(58) Field of Classification Search
CPC .... B65D 55/02; B65D 41/3409; B65D 1/023; B29C 49/48
USPC .......................................... 215/44, 253, 250
See application file for complete search history.

(56) References Cited

U.S. PATENT DOCUMENTS

| | | | | |
|---|---|---|---|---|
| 4,488,655 A | * | 12/1984 | Itsubo | B65D 41/3428 215/252 |
| 4,506,795 A | * | 3/1985 | Herr | B26F 1/18 215/252 |
| 4,592,475 A | * | 6/1986 | Hannon | B29C 33/485 215/252 |
| 4,732,289 A | * | 3/1988 | Granat | B65D 41/3433 215/252 |
| 5,145,078 A | * | 9/1992 | Hannon | B65D 41/3428 215/252 |
| 5,443,171 A | * | 8/1995 | Sprowl | B29C 57/00 215/252 |
| 5,542,556 A | * | 8/1996 | Ohmi | B65D 41/04 215/252 |
| 5,829,612 A | * | 11/1998 | Zumbuhl | B65D 41/3428 215/252 |
| 7,364,045 B2 | * | 4/2008 | Dygert et al. | 215/44 |
| 2005/0005757 A1 | * | 1/2005 | Kowal | B26D 9/00 83/880 |
| 2006/0283828 A1 | * | 12/2006 | Falzoni | B65D 41/3428 215/200 |
| 2008/0116162 A1 | * | 5/2008 | Penny | 215/44 |
| 2008/0314856 A1 | * | 12/2008 | Penny et al. | 215/252 |

* cited by examiner

*Primary Examiner* — James N Smalley
(74) *Attorney, Agent, or Firm* — Sorell, Lenna & Schmidt, LLP (57) ABSTRACT

A container that is formed using a blow molding method. The container includes a neck wall and tamper bead extending from the neck wall. The tamper bead engages a tamper band when a lid comprising the tamper band is mounted to the container. A ratio of a height of the tamper bead to a ratio of the width that the tamper bead extends from the neck wall is in the range of 1.3 to 3.0.

15 Claims, 6 Drawing Sheets

TAMPER EVIDENT CLOSURE FOR CONTAINER

CROSS-REFERENCE TO RELATED APPLICATIONS

This application claims the benefit of the co-pending provisional U.S. patent application Ser. No. 61/251,931, filed on Oct. 15, 2009, and co-pending provisional U.S. patent application Ser. No. 61/347,262 filed on May 21, 2010.

BACKGROUND OF THE INVENTION

1. Field of the Invention

The present invention relates to a container with a closure having a tamper evident band and a mold for manufacturing the container. The present invention is particularly applicable to containers having a blow-molded neck.

2. Description of Related Art

In many industries, such as food, pharmaceutical, medical, and chemical industries, among others, when a container passes through one or more parties, it is desirable or necessary to ensure that the container reaches its destination without the contents being accidentally contaminated or intentionally tampered with. One solution has been to provide tamper-evident closures that provide an indication as to whether the closure has been opened.

Figure 1:
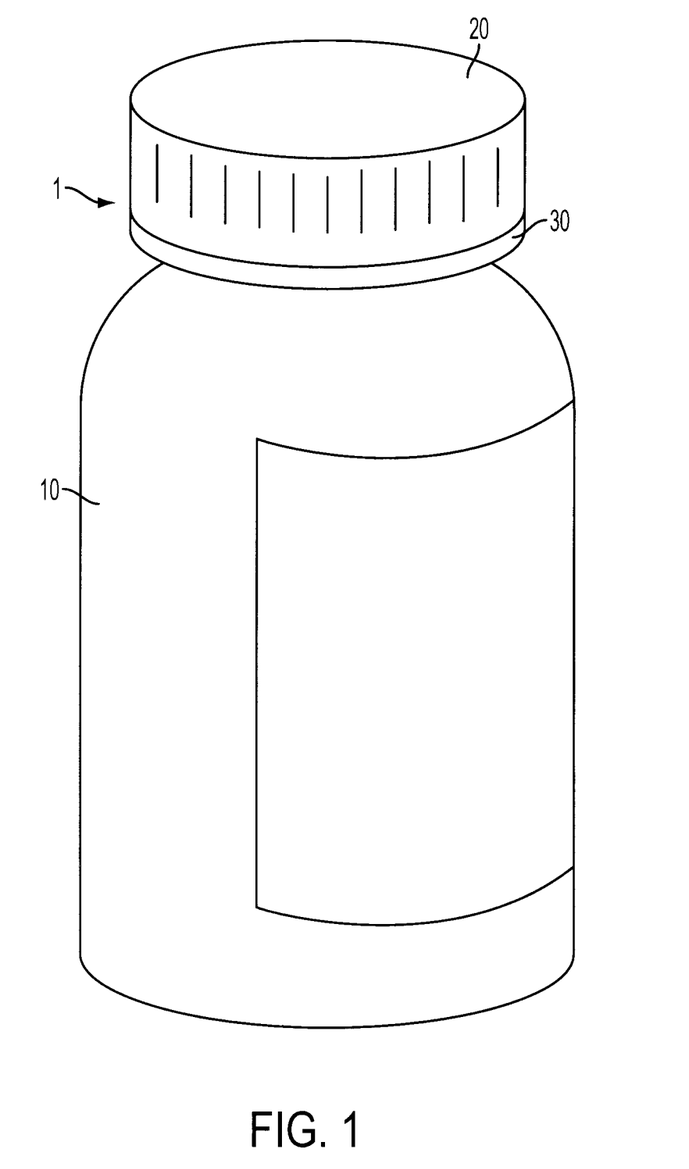
FIG. 1 is a perspective view of a container having a tamper-evident closure with a lid and a tamper band.

One type of tamper-evident closure 1, shown in FIG. 1, comprises a container 10 which is closed by a lid 20, and the lid 20 has a tamper band 30. The tamper band 30 is an annular ring attached to the lid 20 by a breakable connection, such as a thin strip of plastic material.

When the lid 20 and tamper band 30 are mounted on the container 10 in an unopened position, the tamper band 30 is engaged with a tamper bead (not shown in FIG. 1) formed on the container 30. When the lid 20 is removed from the container 10 for a first time, the tamper bead prevents the tamper band 30 from being removed with the lid, thereby breaking the breakable connection between the lid 20 and the tamper band 30. Once the tamper band is separated from the lid, this indicates that the lid has been removed and that the contents of the container may have been contaminated or tampered with.

However, it has been very difficult using a blow-molding method to produce a tamper bead having this desired shape that can be accurately and consistently reproduced. During the blow molding process, the thermoplastic materials used to form a container, such as PET, undergo strain hardening. Once strain hardening occurs, the material is no longer deformable and does not take the shape of the mold. It is especially difficult to form material into sharp angles, since sharp angles require the largest amount of deformation. These problems are further magnified when forming wide-mouth blow-molded containers from PET because of higher stretch ratios which induce more strain hardening. Accordingly, it has been difficult to use a blow molding process to produce a tamper bead having the required shape that creates the proper interface between the tamper bead and the tamper band.

Figure 2:
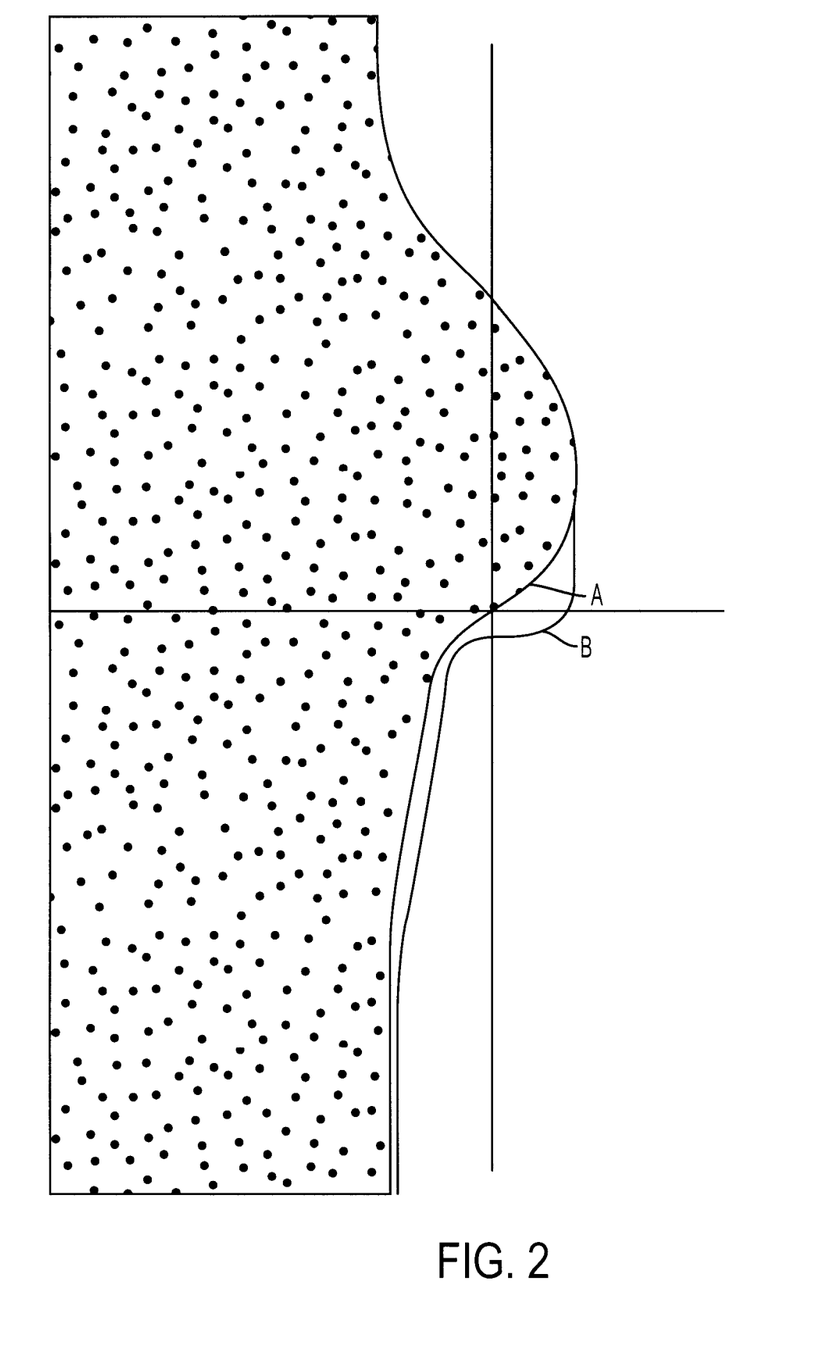
FIG. 2 is an x-ray photograph of a tamper bead of a related container compared to the intended shape of the tamper bead.

FIG. 2 is an x-ray photograph of the profile of an improperly formed tamper bead A compared to the shape of the mold cavity B. As can be seen from FIG. 2, the tamper bead of the blow molded product A does not conform to the shape of the mold cavity B and does not obtain the proper shape. As a result, the bottom face of the tamper bead is curved and angled substantially upward. This allows the tamper band to elastically deform and pass over the tamper bead without breaking the thin strip of material between the lid and the tamper band when the lid is removed from the container. In such a case, the lid and tamper band can be re-mounted to the container, which would provide a false indication that the lid has not been removed. This reduces the confidence that users have regarding the accuracy of the indication provided by the tamper band.

Furthermore, if the tamper bead is too large or improperly formed, the tamper bead will cause the tamper band to inadvertently detach from the lid upon application of the lid to the container, thereby providing a false indication that the lid has been removed.

In view of the above problems, there is a need to provide a container, and a mold for forming the container, having a tamper bead with a shape that can be consistently and accurately produced, while providing a shape that allows the tamper band to properly engage the tamper bead.

SUMMARY OF THE INVENTION

Accordingly, an aspect of the present invention is to provide a container with a tamper bead having a configuration that is accurately formed on a consistent basis.

Advantageously, the container comprises a neck wall, a tamper bead configured to engage a tamper band, and where tamper bead comprises, in a direction extending from a top end of the container to a bottom end of the container, a top surface extending transversely from the neck wall, a side surface extending downward from the top surface, and an interface surface extending toward the neck wall wherein a vertical length from a bottom of the top surface to a top of a portion of the neck wall adjacent to the interface surface defines a first length, and wherein a horizontal length from the neck wall to the outermost portion of the side surface defines a second length, and wherein a ratio of the first length to the second length is in the range of 1.3 to 3.0.

Another aspect of the invention is that the ratio of the first length to the second length is in the range of 1.8 to 2.2.

Another aspect of the invention is that an angle formed by the top surface and an axis extending perpendicularly from the neck wall is in the range of 25° to 45°.

Another aspect of the invention is that the angle formed by the top surface and an axis extending perpendicularly form the neck wall is approximately 30°.

Another aspect of the invention is that a vertical length from a bottom of a portion of the neck wall adjacent the top surface to a top of a portion of the neck wall adjacent the interface surface defines a third length, wherein a ratio of the first length to the third length is in the range of 0.75 to 0.9.

Another aspect of the invention is that a ratio of the first length to a thickness of the neck wall is in the range of 2.8 to 3.3.

Another aspect of the invention is that the container is formed using a blow-molding method.

Another aspect of the invention is that a mold comprising the converse shape of the container as described above can be provided.

Another aspect of the invention is a method comprising providing two mold halves as described above, and forming a container using the mold halves in a blow-molding process.

BRIEF DESCRIPTION OF THE DRAWINGS

The above and other features and aspects of the present invention will become more apparent by describing non-limiting exemplary embodiments thereof with reference to the attached drawings in which.

DETAILED DESCRIPTION OF THE EXEMPLARY EMBODIMENTS

The tamper-evident closure according to non-limiting exemplary embodiments of the present invention will now be described more fully with reference to the accompanying drawings. Furthermore, the specific dimensions described below are for a exemplary embodiment and it should be appreciated that the dimensions could be scaled while still being within the scope of the present invention.

Figure 3:
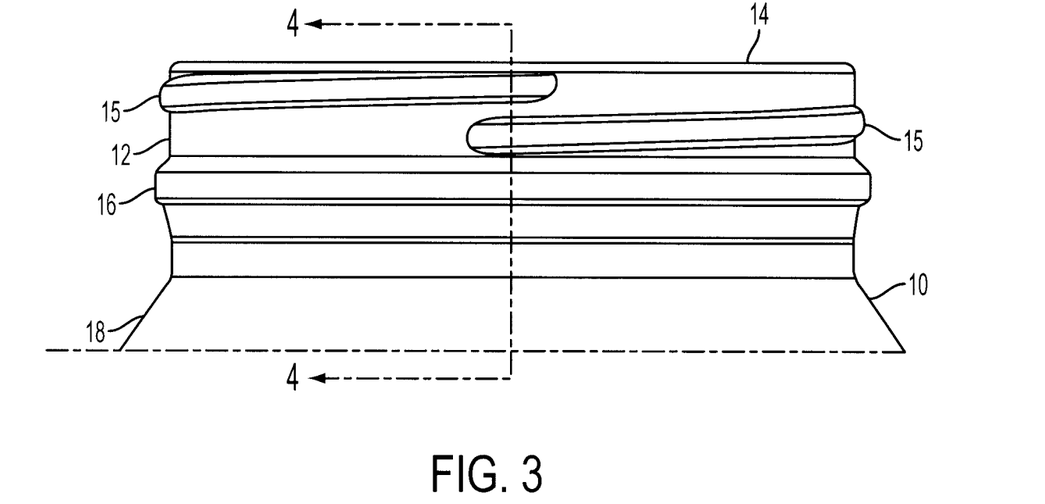
FIG. 3 is a side view of a top of a container according to an exemplary non-limiting embodiment of the present invention.
Figure 4:
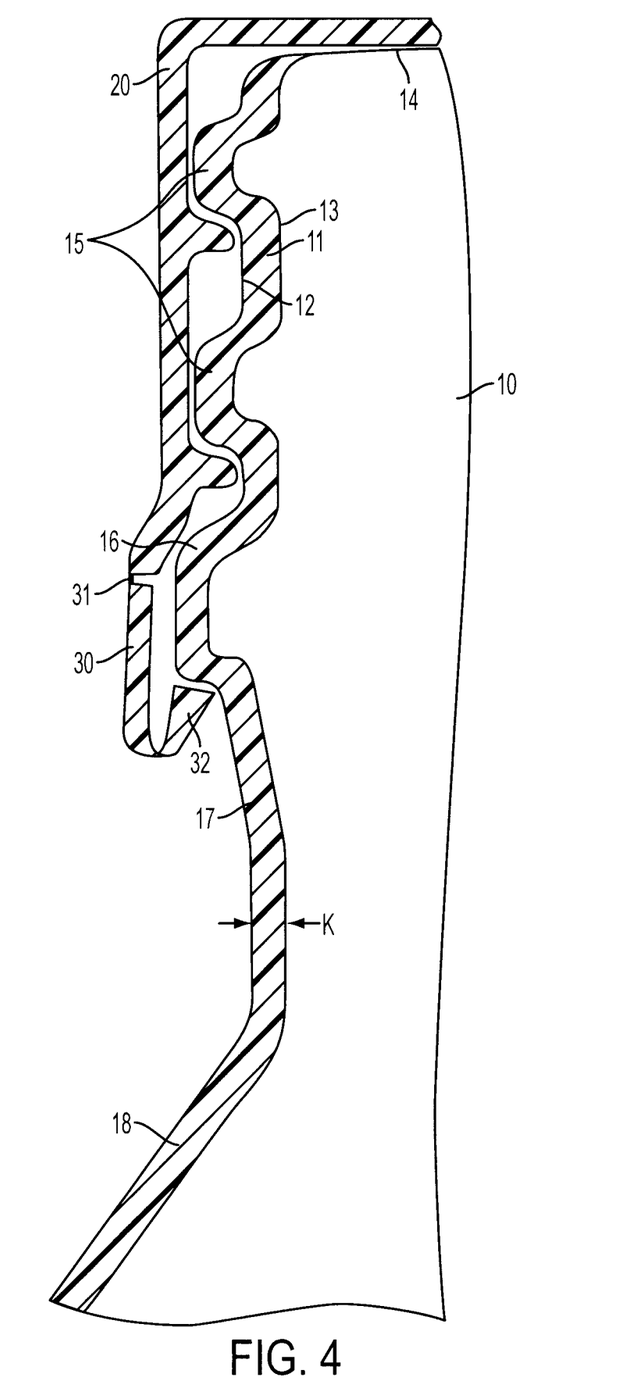
FIG. 4 is a sectional view along line 4-4 in FIG. 3.

Referring to the exemplary embodiment shown in FIGS. 3 and 4, a tamper-evident closure is shown comprising a container 10, a lid 20, and a tamper band 30. The container 10 can be made from any suitable thermoplastic material, such as PET, and can be used in a variety of different applications.

The container 10 comprises a neck wall 11 with an outer surface 12 and an inner surface 13. The neck wall 11 has a wall thickness K approximately in the range of 0.032 to 0.045 inches, and is preferably in the range of 0.038 to 0.044 inches. The neck wall 11 forms a top opening 14 and connects to a lower portion 18 that forms a closed bottom end and stores the contents of the container.

When the container rests on a level surface, the outer surface 12 of the neck wall 11 extends in a substantially vertical direction such that the top opening 14 is located vertically above the bottom of the container. Hereinafter, the term "vertical" will be used to describe a direction that is parallel with the outer surface 12 of the neck wall 11. Consequently, the term horizontal is a direction that extends substantially perpendicular to the neck wall 11. The terms "inward" and "inner" will be used to describe a radial direction that extends toward a central vertical axis the container and the terms "outward" and "outer" will be used to describe a radial direction that extends away from the central vertical axis of the container.

The wall of the container comprises attachment means 15, such as threads or a snap-fit bead, and a tamper bead 16. The attachment means 15 are for attaching the lid 20 to the container 10. The tamper bead 16 is configured to engage the tamper band 30 when the lid 20 and the tamper band 30 are secured to the container. Both the attachment means 15 and the tamper bead 16 extend outwardly from the outer surface 12 of the neck wall 11.

Figure 5:
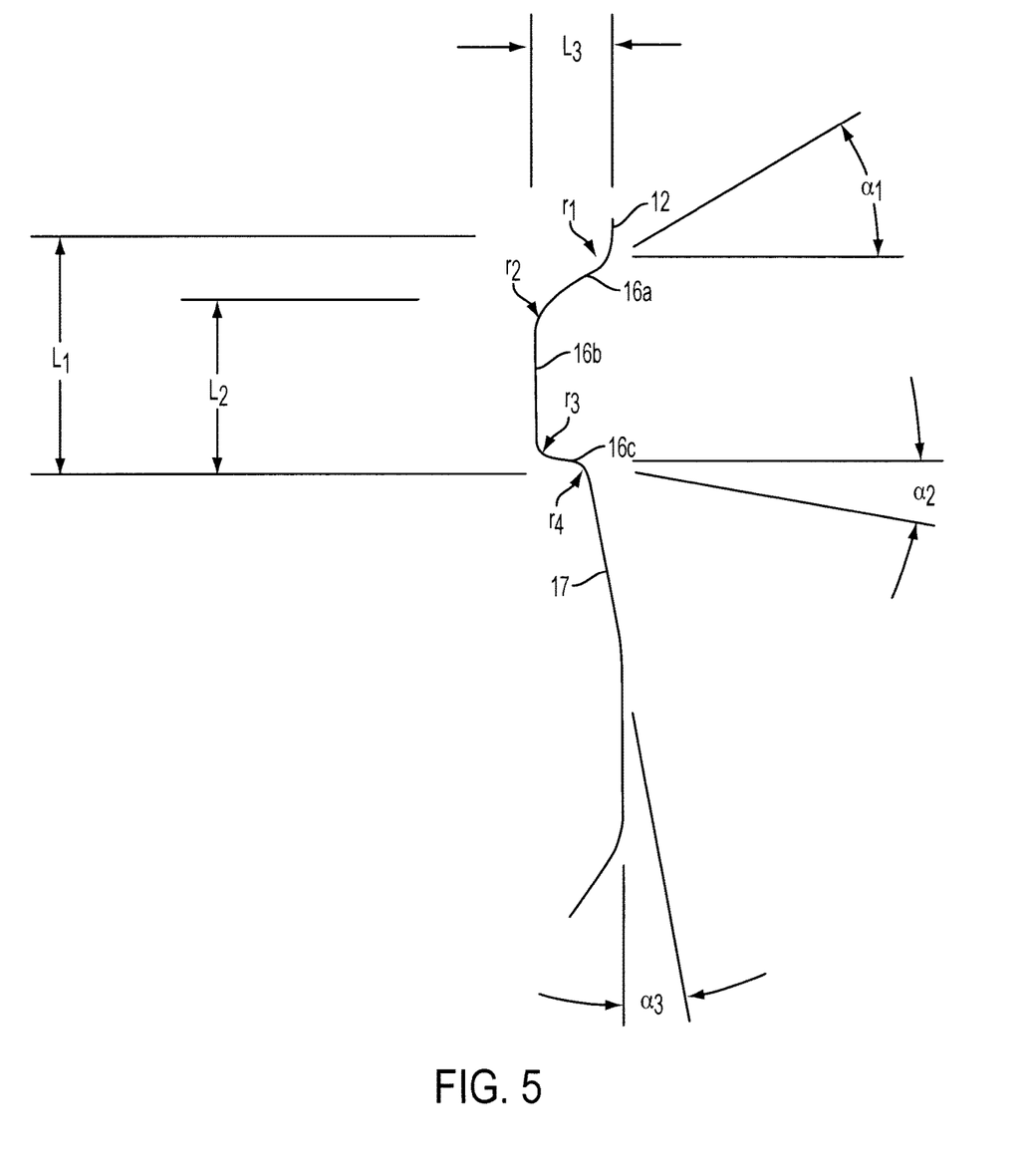
FIG. 5 is an enlarged view of the tamper bead shown in FIG. 4.

Referring to FIG. 5, which is an enlarged view of the tamper bead 16 shown in FIG. 4, the tamper bead 16 comprises, from a top direction to a bottom direction, a top surface 16a, a side surface 16b, and an interface surface 16c. There is also an optional sloping surface 17 that extends from the interface surface 17 to the outer surface 12 of the wall 11.

The top surface 16a extends outwardly and downwardly from the outer surface 12 of the neck wall 11. The angle $\alpha_1$ formed by the top surface 16a and a horizontal axis can range from about 25° to about 45°, and is preferably 30°. The corner formed by the neck wall 11 and the top surface 16a is concave and rounded, having a radius of curvature $r_1$ in the range of 0.015 to 0.025 inches, and is preferably about 0.02 inches.

The side surface 16b extends from a bottom end of the top surface 16a. The side surface 16b extends downward and substantially parallel to the outer surface 12 of the neck wall 11. The corner formed by the top surface 16a and the side surface 16b is convex and rounded, having a radius of curvature $r_2$ in the range of 0.040 to 0.050 inches, and is preferably about 0.045 inches.

The interface surface 16c extends from the bottom of the side surface 16b. The tamper band 30 engages the interface surface 16c when the tamper band 30 and lid 20 are mounted to the container 10, which will be discussed in further detail below. The angle $\alpha_2$ formed by the interface surface 16c and a horizontal axis should be in a range from approximately 0° to 12°. Additionally, there has been success with the angle $\alpha_2$ being in a range of 5° to 12°. The corner formed by the side surface 16b and either the outer surface 12 or the interface surface 16c is concave and rounded, having a radius of curvature $r_3$ in the range of 0.005 to 0.015 inches, and is preferably about 0.01 inches.

When the optional sloped surface 17 is included, the sloped surface 17 extends from the bottom of the interface surface 16c to the outer surface 12 of the neck wall 11. The angle $\alpha_3$ formed by the sloped surface 17 and a vertical axis should be in the range of 5° to 12°, and is preferably 10°. The corner formed by the interface surface 16c and the sloped surface 17 is concave and rounded, having a radius of curvature $r_4$ in the range of 0.005 to 0.015 inches, and is preferably 0.01 inches.

The total vertical height $L_1$ of the tamper bead 16 from the top of the radius of curvature $r_1$ to the bottom of the radius of curvature $r_4$ should be in the range of 0.1 to 0.2 inches, and is preferably approximately 0.15 inches. The vertical height $L_2$ from the bottom of the radius $r_2$ to the bottom of the radius $r_4$ should be in the range of approximately 0.09 to 0.15 inches and is preferably approximately 0.12 inches. The total horizontal extension $L_3$ of the tamper bead 16, from the outer surface 12 to the side wall 16b should be in the range of 0.05 to 0.07 inches and is preferably 0.06 inches.

The tamper band 30 is annular in shape and is attached to a bottom of the lid 20 by a thin strip of breakable material 31. The tamper band 30 comprises one or more flexible tabs 32 made of a resilient material that project radially inward. As the tamper band 30 is mounted to the container, the flexible tabs 32 engage the top surface 16a of the tamper bead 16, which causes the flexible tabs 32 to deflect radially outward and pass over the tamper bead 16. Once the flexible tabs 32 pass the bottom of the side surface 16b, the resiliency of the flexible tabs 32 causes the flexible tabs 32 to deflect radially inward. At this point, an end wall 33 of the flexible tabs 32 engages the interface surface 16c of the tamper bead 16. Due to the downward facing direction of the interface surface 16c, the interface surface 16c prevents the tamper band 30 from being removed from the container 10 when the lid 20 is removed from the container 10, resulting in detachment of the tamper band 30 form the lid 20. One of ordinary skill would appreciate that other types of tamper bands that interact with a tamper bead could be used with the present invention. Accordingly, it can be seen that the configuration and dimensions of the interface surface 16c are important to the functioning of the tamper-evident closure.

The radii of curvature $r_3$ and $r_4$ of the tamper bead 16 are important to the proper formation of the interface surface 16c. If either of the radii of curvature $r_3$ or $r_4$ are too large, the length of the interface surface 16c is shortened or improperly formed, thereby creating an insufficient contact surface for the tamper band 30 which would allow the tamper band 30 to expand radially outward and slip over the tamper bead 16 without breaking the connection between the tamper band 30 and the tamper bead 16. However, using previously known designs for tamper beads it has been very difficult to accurately and consistently form the interface surface 16 and the radii of curvature $r_3$ and $r_4$. Due to the strain hardening characteristics of thermoplastic materials, such as PET, it is difficult to blow mold the material to closely follow the contours of the mold, especially at the radii $r_3$ and $r_4$.

The design of the present invention overcomes this problem. In particular, it is important that the angle $\alpha_1$ be in the range of 25-45°. By decreasing the angle $\alpha_1$, the length of the side surface 16b is increased, thereby increasing $L_2$ and allowing more material to fill the mold cavity that forms the tamper bead. Thus, the particular relationships of the dimensions of the exemplary embodiments allow the radii $r_3$, $r_4$ and the interface surface 16c to be properly and consistently formed.

Applicants have found that the tamper bead 16 will be properly and consistently formed when the ratio $L_2/L_3$ is in the range of 1.3 to 3.0 and preferably in the range of 1.8 to 2.2. Consequently, in accordance with the exemplary dimensions as described above, the following ratios should be approximately within the ranges listed below:

$L_2/L_1$: 0.75 to 0.9;
$L_2/K$: 2.8 to 3.3;
$L_2/r_3$ (or $r_4$): 10 to 18.

In view of the above advantages of the exemplary embodiment described above, a container can be formed with a tamper bead that is accurately and consistently reproduced.

Figure 6:
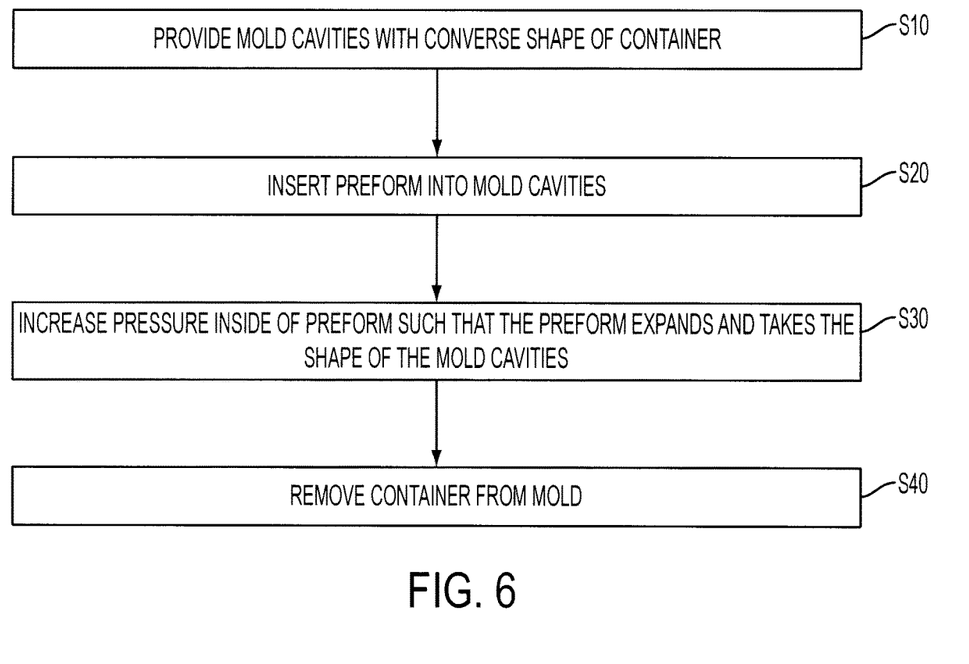
FIG. 6 is diagram of the blow-molding process used to form the container shown in FIGS. 3-5.

Furthermore, the containers as described above are formed using at least two mold cavities, the mold cavities comprising a converse shape of the container as described above and shown in FIG. 5. A diagram of the molding process is shown in FIG. 6. To form the container, the mold cavities are provided S10, a preform is inserted into the mold cavities S20, and the preforms are blow molded S30, i.e. a pressure on the inside of the preform is increased, such that the preform takes the shape of the mold cavities. After the container has been formed, the container is allowed to cool to a certain degree and then removed form the mold cavities S40.

While this invention has been particularly shown and described with reference to exemplary embodiments thereof, the above description should be considered as illustrations of the exemplary embodiments only and are not for purposes of limitation. Therefore, the scope of the invention is defined not by the detailed description of the invention but by the appended claims, and all differences within the scope will be construed as being included in the present invention.

What is claimed is:

1. A container comprising:
   a lid consisting of a threaded portion and a tamper band coupled to the threaded portion;
   a body defining a longitudinal axis and a horizontal axis that extends perpendicular to the longitudinal axis;
   a neck extending vertically upward from the body of the container;
   a neck wall comprising wall portions of the neck extending from the container body that extend above and below a tamper bead, the tamper bead protruding radially outward from wall portions of the neck wall and configured to engage the tamper band when the lid is mounted to the neck, the wall portions comprising portions of the neck radially above and below the tamper bead, the lid comprising an inner surface that directly engages an outer surface of the neck wall, the lid comprising a recess that extends into the inner surface, the recess defining a breakaway portion, the tamper band being attached to a bottom of the lid by the breakaway portion, the tamper bead comprising, in a direction extending from a top end of the container to a bottom end of the container:
   a top surface extending transversely from an upper wall portion of the neck wall in a non-vertical direction;
   a side surface extending downward from the top surface in a vertical direction, the lid being spaced apart from the side surface when the tamper band engages the tamper bead; and
   an interface surface extending toward a lower wall portion of the neck wall from a bottom of the side surface in a non-vertical direction, the interface surface extending at an angle between 5° and 12° relative to the horizontal axis;
   wherein a length of the side surface extending vertically from the top surface to the interface surface defines a second length;
   wherein a length of the tamper bead begins from an outer surface of the upper wall portion where the upper wall portion meets the top surface and extends perpendicularly from the upperwall portion to an outermost portion of the side surface that is most horizontally distant from the upper wall portion defines a third length; and
   wherein a ratio of the second length divided by the third length is in the range of 1.3 to 3.0.

2. The container according to claim 1, wherein the ratio of the second length to the third length is in the range of 1.8 to 2.2.

3. The container according to claim 1, wherein an angle formed by the top surface and an axis extending perpendicularly from the neck wall is in the range of 25° to 45°.

4. The container according to claim 1, wherein the angle formed by the top surface and an axis extending perpendicularly form the neck wall is 30°.

5. The container according to claim 1, wherein a vertical length from a portion of the neck wall intersecting the top surface to a portion of the neck intersecting the interface surface tamper bead from the side surface to the neck wall defines a first length; wherein a ratio of the second length to the first length is in the range of 0.75 to 0.9.

6. The container according to claim 1, wherein a ratio of the second length to a thickness of the neck wall is in the range of 2.8 to 3.3.

7. The container according to claim 1, wherein the container is formed using a blow-molding method.

8. The container according to claim 1, wherein the interface surface extends at a 5° angle relative to the horizontal axis.

9. The container according to claim 1, wherein the interface surface extends at a 12° angle relative to the horizontal axis.

10. The container according to claim 1, wherein the neck comprises a thread, the tamper bead comprising a maximum diameter that is greater than that of the thread.

11. The container according to claim 1, wherein the side surface extends parallel to the longitudinal axis along the second length.

12. The container according to claim 1, wherein:
the tamper bead comprises a second rounded corner between the top surface and the side surface and a third rounded corner between the side surface and the interface surface; and
the side surface extends parallel to the longitudinal axis from the second rounded corner to the third rounded corner.

13. The container according to claim 12, wherein the second rounded corner has a radius of curvature from 0.040 inches to 0.050 inches.

14. The container according to claim 12, wherein the third rounded corner has a radius of curvature from 0.005 inches to 0.015 inches.

15. The container according to claim 1, wherein the recess faces the outer surface of the neck wall when the lid is coupled to the neck.

\* \* \* \* \*